United States Patent [19]

Kondo

[11] Patent Number: 4,703,670
[45] Date of Patent: Nov. 3, 1987

[54] WAVE GEAR DRIVE AND GEAR GENERATING METHOD

[75] Inventor: Koshi Kondo, Ibaraki, Japan

[73] Assignee: Agency of Industrial Science & Technology, Ministry of International Trade & Industry, Tokyo, Japan

[21] Appl. No.: 846,003

[22] Filed: Mar. 31, 1986

[30] Foreign Application Priority Data

Mar. 30, 1985 [JP] Japan .................................. 60-68089
Mar. 30, 1985 [JP] Japan .................................. 60-68090
Mar. 30, 1985 [JP] Japan .................................. 60-68091

[51] Int. Cl.$^4$ .............................................. F16H 1/10
[52] U.S. Cl. ...................................... 74/640; 74/461; 74/462
[58] Field of Search ................. 74/640, 804, 805, 461, 74/462

[56] References Cited

U.S. PATENT DOCUMENTS 2,906,143  9/1959  Musser .................................. 74/640
2,931,248  4/1960  Musser .................................. 74/640
3,161,081 12/1964  Musser .................................. 74/640
3,996,816 12/1976  Brighton ............................... 74/640

Primary Examiner—Rodney H. Bonck
Assistant Examiner—David A. Testardi
Attorney, Agent, or Firm—Oblon, Fisher, Spivak, McClelland & Maier

[57] ABSTRACT

A wave gear drive comprises a rigid gear, a flexible gear engaging at a plurality of bulged regions thereof with the rigid gear, and a wave generator for causing the flexible gear to perform wave motion. The number of gear teeth between adjacent bulged regions differs between the two gears and the relative motion between the two gears is caused by shifting of the engagement regions. The teeth of the two gears are formed to satisfy the conditions that the shapes of imaginary rolling contact plate which performs the same motion as the aforementioned relative motion are determined to correspond to the loci described on planes fixed on the respective teeth by the respective momentary centers of relative tooth motion and that the common normal of the respective teeth at the meshing point passes through the momentary contact point of the rolling contact plates.

3 Claims, 17 Drawing Figures

FIG_4

FIG_6

FIG_5(a)

FIG_5(b)

FIG_5(c)

FIG.7

FIG_9

FIG_10

FIG_11

FIG_12

FIG_13

FIG_14

4,703,670

WAVE GEAR DRIVE AND GEAR GENERATING METHOD

FIELD OF THE INVENTION AND RELATED ART STATEMENT

This invention relates to a wave gear drives and to method for generating the gear.

In U.S. Pat. Nos. 2,906,143 and 2,959,065, C. W. Musser discloses a harmonic drive in which a thin, hollow cylindrical gear made from a flexible material is positively flexed and the flexing motion of this gear is used to realize a simply constructed gear drive that is able to provide a large speed change ratio and can be made compact and light in weight. Because of these features, this harmonic drive has drawn wide-spread attention for its usefulness in industrial robots as well as measurement, medical and aerospace equipment.

In the wave gear drives proposed up to now, the rigid gear and flexible gear constituting the drive have employed either the linear gear tooth profile or the involute gear tooth profile. The use of these profiles is, however, not based on a strict theoretical analysis of tooth engagement but merely on the results of an approximate analysis relating to the case of a large gear ratio. Thus one of the reasons for the low efficiency of the harmonic drives in current use is the poor tooth engagement caused by use of an inappropriate tooth profile and this inefficiency is especially large in the case of a small speed change ratio.

Research into gears which perform wave motion is by and large lagging behind that into more ordinary gear types. If smooth engagement of wave motion type gears is to be realized, therefore, it will be necessary to determine tooth profile on the basis of careful analysis of the geometry of the movement and engagement of wave motion gears.

OBJECT AND SUMMARY OF THE INVENTION

An object of the present invention is to provide a wave gear drive which minimizes decrease in efficiency at small speed change ratio.

The present invention attains this object by providing a wave gear drive comprising a non-deformable rigid gear, a flexible gear for performing wave motion and a wave generator for causing the flexible gear to perform wave motion, the flexible gear engaging with the rigid gear at a plurality of bulged regions of the flexible gear such that the number of gear teeth between adjacent bulged regions differs between the rigid gear and the flexible gear and relative motion being caused between the rigid gear and the flexible gear by shifting of the engagement regions, wherein the improvement comprises the teeth of the rigid gear and the flexible gear being formed to satisfy the conditions that the shapes of imaginary rolling contact plates which perform the same motion as the respective engaged tooth pairs of the rigid gear and the flexible gear are determined to correspond to the loci described on planes fixed on the respective teeth by the respective momentary centers of relative tooth motion and that the common normal of the respective tooth pairs at the meshing point passes through the momentary contact point of the rolling contact plates. Thus in the wave gear drive according to this invention, the tooth profiles of the rigid and flexible gears are determined on the basis of a thorough analysis so that engagement therebetween is very smooth even when the speed change ratio is small, whereby the wave gear drive can operate stably as a speed change device. As gear meshing is smooth in the wave gear drive according to this invention, it is possible to obtain a speed change device with outstanding operational performance, load capacity and service life.

DESCRIPTION OF PREFERRED EMBODIMENT

Figure 1A:
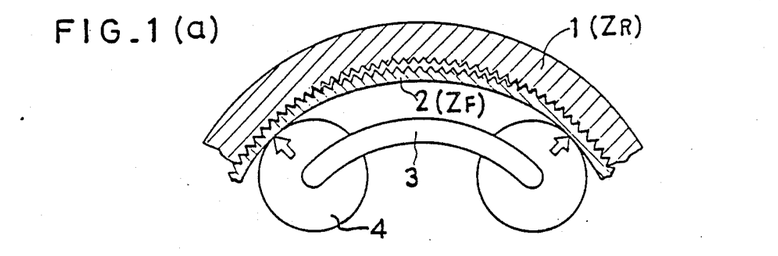
FIG. 1(a) is a schematic cross-sectional view of one embodiment of a wave gear drive according to this invention.

In FIG. 1(a) is shown a wave gear drive comprising an inner gear having a given number of external teeth and an outer gear having a slightly larger number of internal teeth. The outer gear constitutes a rigid gear 1 which is assumed to be fixed, while the inner gear constitutes a flexible gear 2 which is formed as a thin flexible ring so as to be flexible in its radial direction. A pair of rollers 4 constituting one part of a wave generator 3 and functioning as a cam are disposed to be rotatable within the flexible gear 2. The rollers 4 flex the flexible gear 2 radially outward causing it to engage at a plurality of flexibly bulged regions with the rigid gear 1. The bulged regions are shifted by the rotation of the wave generator 3, causing the flexible gear 2 to rotate in the opposite direction from that in which the wave generator 3 rotates.

Figure 1B:
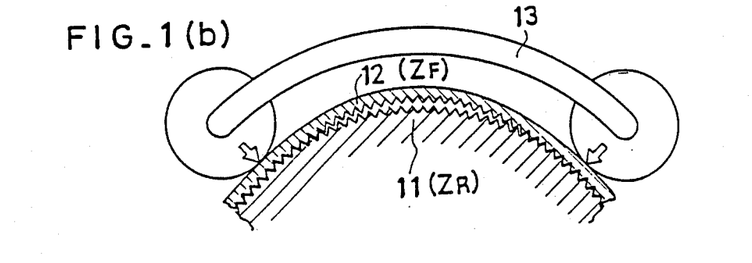
FIG. 1(b) is a schematic cross-sectional view of another embodiment of the wave gear drive.

FIG. 1(b) shows a modification of the same device in which, oppositely from the device of FIG. 1(a), the inner gear with external teeth constitutes a rigid gear 11 and the outer gear with internal teeth constitutes a flexible gear 12. A wave generator 13 having a pair of rollers 14 is rotatably provided on the outer surface of the flexible gear 12. In this case, if the rigid gear 11 is fixed, the flexible gear 12 will rotate in the same direction as the wave generator 13.

I. Basic conditions

The flexible gear in the aforesaid wave drive is made from a thin plate of flexible material. The thickness of the gear is thus much smaller at the tooth space portions than at the tooth portions so that the deformation during flexing can be considered to occur solely at the bottom lands. Therefore, though there is relative motion among the respective teeth during flexing, the individual teeth themselves can be considered to be rigid. This means that the bottom land portions of the flexible gear can be considered to link the gear teeth thereof as hinges, so that the motion of the flexible gear is exactly the same as that of a roller chain. Moreover, when the thin plate from which the gear is made is bendingly deformed, there exists a neutral line which maintains the same length as that prior to bending, and this can be considered to be the same as what would be obtained by smoothly connecting the centers of the hinges of a roller chain.

Figure 2:
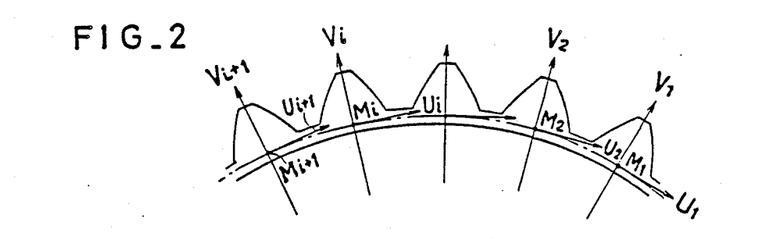
FIG. 2 is an explanatory view of a coordinate system for a flexible gear.

Next, with reference to FIG. 2, for each of the gear teeth consider an orthogonal coordinate system ($M_i$-$u_i$, $v_i$) having as its abscissa the line $u_i$ tangent at point $M_i$ on the neutral line and as its ordinate the normal line $v_i$ (which passes through the center of the tooth). (i indicates the tooth number.) Here, make the following assumptions:

a. During motion of the flexible gear there is no change in the shape of the gear teeth as observed with respect to the coordinate systems (M-u, v) fixed relative to the respective teeth.

b. The pitch between the respective teeth $\overline{M_iM_{i+1}}$ is constant on the neutral line.

These assumptions can be considered reasonable so long as the amount of deformation of the flexible gear is small.

Figure 3:
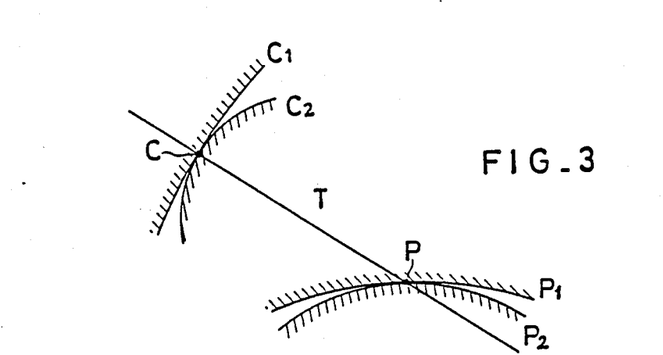
FIG. 3 is an explanatory view showing the relation between the tooth profiles and imaginary rolling contact plates.

If the individual teeth are considered to be rigid, it then becomes possible to determine the tooth profile by using an ordinary tooth profile analysis method to investigate the tooth movement. More specifically, as shown in FIG. 3, presuming the tooth profile $C_1$ and the imaginary rolling contact surface or plate $P_1$ to be the same and the tooth profile $C_2$ and the imaginary rolling contact plate $P_2$ to be integral, then the tooth profile can be determined on the basis of the required mechanical condition that the common normal T at the meshing point C between the teeth must pass through the point of contact (the momentary center) between the imaginary rolling contact plates $P_1$, $P_2$ which make the same relative motion.

II. Kinematic analysis

The principle of the wave gear drive is adaptable to either a linear drive or rotational drive. Here, the case of rotational drive will be considered. More specifically, prior to deformation, the flexible gear is a cylindrical gear having $Z_F$ teeth and the rigid gear is a cylindrical gear having $Z_R$ teeth. Ordinarily, $Z_F$ and $Z_R$ are not equal. FIG. 1(a) shows a case where $Z_F < Z_R$ and FIG. 1(b) a case where $Z_F > Z_R$. The wave generator is here presumed to be a non-circular cam having n number of protuberances and the cam is inserted into the center void of the thin-walled flexible gear without expanding or contracting its neutral line. Consideration is thus given here to the case of FIG. 1(a) where the flexible gear and the rigid gear make engagement in the vicinity of n number of bulged regions. It is further presumed that no frictional force arises between the cam and the flexible gear.

Defining the diameter of the neutral line of the flexible gear prior to deformation as $d_{OF}$, it follows from the aforesaid assumption b that the tooth pitch at the neutral line, $\pi d_{OF}/Z_F$, is the same before and after deformation, and the neutral line of the flexible gear after deformation into a bulged non-circular shape will be referred to as the flexible reference curve. The rigid gear has a pitch circle with the same pitch as the flexible reference curve. This will be referred to as the relative reference circle of the rigid gear, and defining its diameter as $d_{OR}$, the diameter is obtained by the following equation.

$$d_{OR} = (Z_R/Z_F) \times d_{OF} \qquad (1).$$

Although it is possible for the rigid gear, flexible gear and wave generator to all rotate about the same fixed center, it will be assumed first that the wave generator is fixed and that the rigid gear rotates at a fixed angular velocity $\Omega$ traversing an angle $\phi$ in time t. During this same time t, the teeth of the flexible gear move at a uniform velocity along the flexible reference curve in the same direction as the rigid gear by a distance of $$S = (Z_R/Z_F) \times (d_{OF}/2) \times \phi \qquad (2)$$

while the portion for deriving the rotational motion of the flexible gear rotates at the fixed angular velocity of $\Omega \times Z_R/Z_F$.

Next for investigating the motion of the flexible gear relative to the rigid gear, the rigid gear will be assumed to be fixed and the motion of the flexible gear when the wave generator is rotated will be analyzed.

Figure 4:
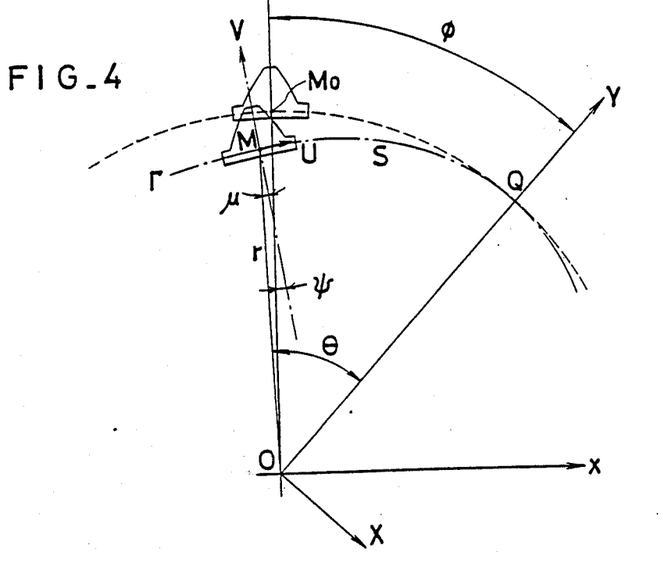
FIG. 4 is an explanatory view showing the motion of a single tooth of the flexible gear.

In FIG. 4 (O-x, y) is an orthogonal coordinate system fixed to the rigid gear with its origin located at the center of rotation 0 of the gear shaft and its y-axis passing through the center of a tooth space of the rigid gear, (M-u, v) is an orthogonal coordinate system fixed to the flexible gear with its origin located at a point M on the flexible reference curve, its u-axis lying tangent to the flexible reference curve and its v-axis passing through the center of the tooth on which the coordinate system is fixed, and (O-X, Y) is an orthogonal coordinate system fixed on the wave generator with its Y-axis passing through the peak of the bulged region.

At the time the Y-axis and the y-axis are coincident, it is assumed that the origin of the coordinate system (M-u, v) fixed on the tooth of the flexible gear positioned at the peak of the bulged region is at the peak $M_o$ of the bulged portion of the flexible reference curve and that the v-axis lies on the y-axis. Then when the wave generator rotates by the angle $\phi$ from the origin, the peak of the bulged region of the flexible reference curve moves from $M_o$ to Q and the origin of the tooth of the flexible gear moves from $M_o$ to M. At this time the tooth of the flexible gear moves relative to the wave generator such that its origin (i.e., the origin of the coordinates (M-u,v) of the point fixed to the tooth of the flexible gear) moves from Q to M, and the distance moved QM is as represented by S in equation (2).

Now represent the shape of the flexible reference curve Γ in the following polar coordinate system wherein O is the pole, the major axis Y is the origin line, r is the radius vector and θ is the argument:

$$r = f(\theta) \quad (3)$$

Now assuming that the flexible reference curve has n number of bulges and that f(θ) is a function having a period of 2π/n, this can be generally represented by the following Fourier series:

$$f(\theta) = \frac{a_0}{2} + \sum_{k=1}^{\infty} \{a_k \cos(kn\theta) + b_k \sin(kn\theta)\}. \quad (4)$$

If the length of the curve defined by angle θ in FIG. 4 is defined as S, then by assuming this S to be equal to the S in equation (2), the relation between the rotation angle φ of the wave generator and the argument θ of the point M can be expressed as:

$$S = \frac{Z_R}{Z_F} \times \frac{d_{OF}}{2} \times |\phi| \quad (5)$$

$$= \int_0^{|\theta|} \sqrt{\{f(\theta)\}^2 + \{f(\theta)'\}^2} \, d\theta.$$

Although the equation (5), does not enable the relation between the angle φ and the angle θ to be expressed as an elementary function, this relation can invariably be obtained by numerical integration.

Next, when the coordinates (x, y) of the point M are made (x_M, y_M), it follows that $$\left. \begin{array}{l} x_M = -r\sin(\theta - \phi) \\ y_M = r\cos(\theta - \phi) \end{array} \right\}, \quad (6)$$

And when the angle between the y-axis and the v-axis is defined as ψ, it follows,that $$\psi = \theta - \phi + \mu \quad (7),$$

where μ is the angle which the v-axis makes with the radius vector OM and is found from the relation $$\tan\mu = -(1/r)(dr/d\theta) \quad (8).$$

The coordinate conversion equation between (O-x, y) and (M-u, v) is thus $$\left. \begin{array}{l} u = (x - x_M)\cos\psi + (y - y_M)\sin\psi \\ v = (y - y_M)\cos\psi - (x - x_M)\sin\psi \end{array} \right\}. \quad (9)$$

Here, if the coordinates (x, y) of the momentary center of movement (i.e. the point P) of the coordinates (M-u, v) with respect to the coordinates (O-x, y) are defined as (x_p, y_p), it follows that $$\left. \begin{array}{l} x_P = x_M - \dfrac{dy_M}{d\psi} \\ y_P = y_M + \dfrac{dx_M}{d\psi} \end{array} \right\}. \quad (10)$$

Now if φ is varied and the loci described by the point P in the (O-x, y) coordinate system and the (M-u, v) coordinate system are determined, the result will be the shapes of imaginary rolling contact plates which respectively move integrally with the rigid gear and the flexible gear.

III. Calculation examples

1. Shape of the imaginary rolling contact plates

A concrete calculation will now be made for a drive in which a wave generator with two bulged portions and having a shape resembling an elipse is inserted in the center void of a flexible gear.

Represent the shape of the flexible reference curve obtained by deforming a neutral line having a diameter of $d_{OF}$ without changing its length in a polar coordinate system in which r is the radius vector, θ the argument and d and δ are constants. Then, $$r = (d/2) + (\delta/2) \cos 2\theta \quad (11).$$

This is symmetrical to the major axis, is an evennumbered function with π as the period, and is the simplest form of equation (4). It is assumed that the shape does not change with the load.

As the perimeter of this flexible reference curve is four times the portion thereof within the first quadrant, it can be written as $$4 \int_0^{\frac{\pi}{2}} \sqrt{r^2 + \left(\frac{dr}{d\theta}\right)^2} \, d\theta = \pi d_{OF}. \quad (12)$$

The maximum diameter d+δ of the flexible reference curve and the diameter $d_{OR}$ of the relative reference circle of the rigid gear are related as follows by a coefficient λ.

$$d + \delta = \lambda d_{OR} \quad (13).$$

λ will be referred to as the coefficient of deviation and when λ=1, i.e. when the relative reference circle is tangent to the flexible reference curve at the maximum diameter point thereof, the condition corresponds to the engagement of involute standard gears, and when λ≠1 the condition corresponds to the engagement of involute profile shifted gears.

Once d and δ have been determined from the equations (1), (12) and (13) and the shape of the flexible reference curve has been determined, the shape of the imaginary rolling contact plate can be found.

Figure 5A:
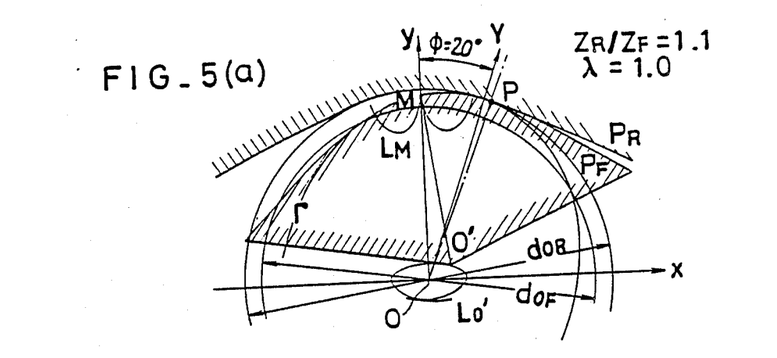
FIGS. 5(a)-(c) are explanatory views showing other examples of imaginary rolling contact plates for the rigid gear and the flexible gear.

FIGS. 5(a), (b) and (c) illustrate the imaginary rolling contact plates of the rigid gear and the flexible gear and the loci thereof for cases where the tooth ratio $Z_R/Z_F = 1.1$ and λ=1.0, λ<1.0, and λ>1.0, respectively. The coordinate systems are set up in the same manner as in FIG. 4.

Figure 5B:
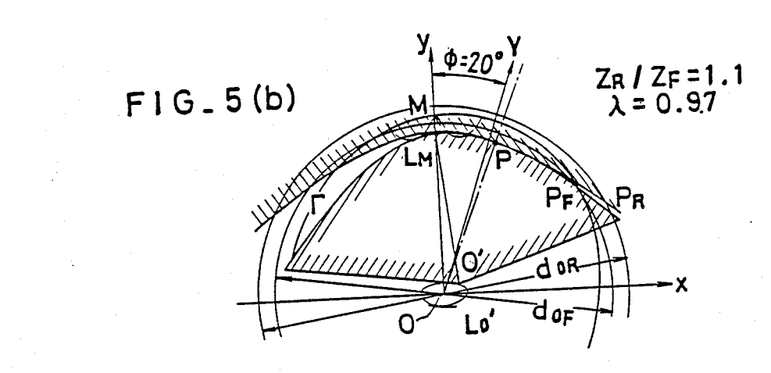
Figure 5C:
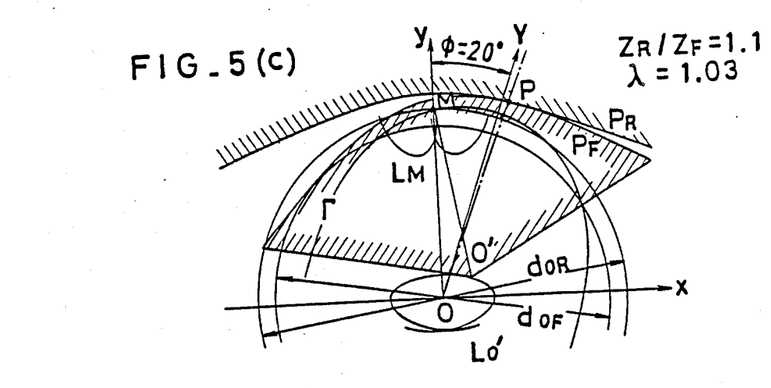

With the rotation of the wave generator, the imaginary rolling contact plate $P_F$ integral with the tooth of the flexible gear which was positioned at the peak of the bulged region describes nonslipping rolling motion together with the imaginary rolling contact plate $P_R$ of the rigid gear, and when φ=20°, it assumes the position shown in the figures with point P as the meshing point. The imaginary rolling contact plates have such shape that they approach an asymptotic line (i.e., only a portion is shown) positioned at ψ/dφ→0. Moreover, defining the coordinate position of the center of rotation O of the tooth, assumed prior to deformation of the flexible gear, i.e. when the neutral line is circular, in the coordinate system (M-u, v) fixed on the tooth of the flexible gear as O', the figures also show the loci $L_M$, $L_O$, of M and O'. Naturally, the normal to $L_M$ at point M and the normal to $L_O$, at O' both pass through the point P.

2. Tooth profile of flexible gear when rigid gear has involute tooth profile

Although there are an infinite number of conceivable tooth profiles, the profile most widely used in practical applications today is the involute curve. Here, therefore, it will be assumed that the rigid gear has involute teeth and an explanation will be given of an example of a tooth profile for the flexible gear in meshing with such a rigid gear.

In such case, the internal teeth of the rigid gear can be thought of as being cut to have an involute profile by an imaginary basic rack corresponding to an external gear that would mesh perfectly with the internal gear, and the addendum modification coefficient is also the same as that for such an external gear. In such case, if the reference circle diameter determined by the number of teeth and the tool module is defined in as $d_O$, this $d_O$ will not necessarily coincide with the relative reference circle diameter $d_{OR}$ described in the foregoing. More specifically, if the difference between $d_O$ and $d_{OR}$ is defined as $2h_R$, then since $$d_O = Z_R M = d_{OR} + 2h_r \quad (14),$$

it is possible to locate the reference circle at an appropriate position with respect to the relative reference circle. Here, m represents the module of the aforesaid basic rack.

Figure 6:
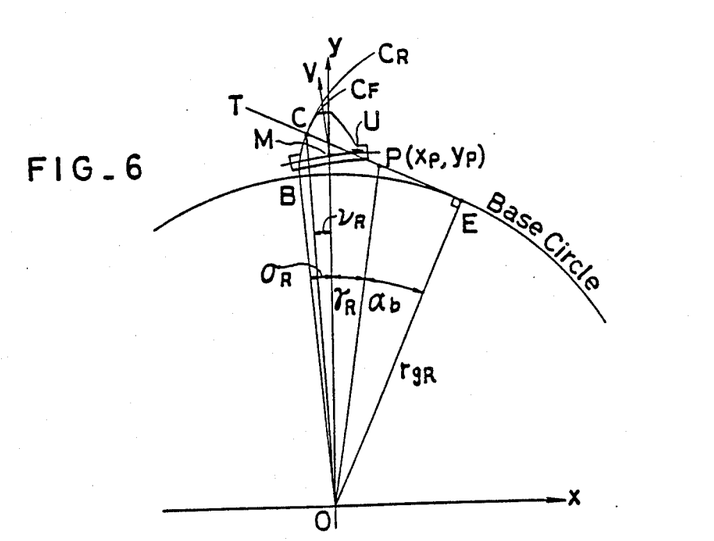
FIG. 6 is an explanatory view of the engagement of a flexible gear and a rigid gear having involute profile teeth.

Referring to FIG. 6, $C_R$ denotes the rigid gear tooth profile which is an involute curve having a base circle radius $r_{gR}$, while $C_F$ denotes a tooth profile of the flexible gear for engagement with the rigid gear. Assuming that the tooth profile $C_R$ and the tooth profile $C_F$ are meshed at the point C, a common normal T of the tooth profiles drawn through the point C will pass through the rolling contact point P of imaginary rolling contact plates which describe the same relative motion as the tooth profile $C_R$ and the tooth profile $C_F$, and will also lie tangent to the base circle of the involute gear at the point E.

Now defining the coordinate system fixed on the tooth of the rigid gear and having its y-axis passing through the center of the tooth space as (O-x, y), find the coordinates ($x_c$, $y_c$) of the point C in this coordinate system.

The angle $Y_R$ of OP to the y-axis is $$\gamma_R = \tan^{-1}(x_p/y_p) \quad (15)$$

Defining angle POE as $\alpha_b$, the angle $\alpha_b$ is obtained by the following equation.

$$\alpha_b = \cos^{-1}(r_{gR}/\sqrt{x_P^2 + y_P^2}) \quad (16)$$

where $x_p$ and $y_p$ are the (x, y) coordinates of point P as given by equation (10).

Next, defining the gear space width half-angle on the base circle as $\sigma_R$, it follows that $$\sigma_R = \frac{\pi}{2Z_R} + inv\alpha_o + \frac{2 \tan \alpha_o}{Z_R} x_R \quad (17)$$

where $\alpha_o$ is the pressure angle of the tool and $X_R$ is the addendum modification coefficient.

From the nature of the involute profile, $$\overline{CE} = BE \quad (18)$$
$$= r_{9R}(\pm \gamma_R + \alpha_b + \sigma_R)$$

and $$\overline{CE} = r_{9R} \tan(\pm \gamma_R + \alpha_b \mp \nu_R) \quad (19).$$

Therefore, $$\nu_R = \gamma_R \pm \{\alpha_b - \tan^{-1}(\pm\gamma_R + \alpha_b + \sigma_R)\} \quad (20)$$

so that $$\overline{OC} = r_{gR}\sqrt{1 + (\pm\gamma_R + \alpha_b + \sigma_R)^2} \quad (21)$$

$$\left.\begin{array}{l} x_c = \overline{OC} \sin\nu_R \\ y_c = \overline{OC} \cos\nu_R \end{array}\right\} \quad (22)$$

Where there are alternative signs, the upper one is for the left tooth flank and the lower one for the right.

When the coordinates $x_c$, $y_c$ are viewed from the coordinate system (M-u, v) fixed to the flexible gear, the profile of the flexible gear can be obtained. More specifically, the desired tooth profile is obtained by substituting the coordinates $x_c$, $y_c$ for x, y in equation (9).

Figure 7:
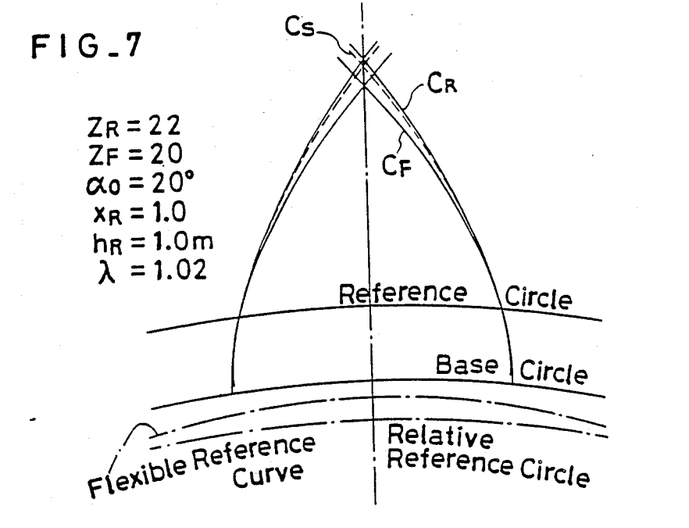
FIG. 7 is an explanatory view of the tooth profile of a flexible gear engaged with a rigid gear having an involute tooth profile.

FIG. 7 shows a tooth profile $C_F$ calculated based on the foregoing example for a flexible gear having twenty teeth ($Z_F=20$) intended for backlash-free engagement at a deviated state of $\lambda=1.02$ with an involute rigid gear $C_R$ having twenty-two teeth ($Z_R=22$), a tool pressure angle of 20° and an addendum modification coefficient $X_R$ of 1.0 wherein $h_R=1.0$ m.

By way of reference, there is shown in dotted lines in the same figure the tooth profile $C_S$ of a twenty-tooth involute gear engaged with the rigid gear and having a tool pressure angle of 20° and an addendum modification coefficient $X_F=1.0$. It will be noted that the tooth profile $C_F$ of the flexible gear has less tooth thickness toward the tip than the involute tooth profile $C_S$.

Figure 8:
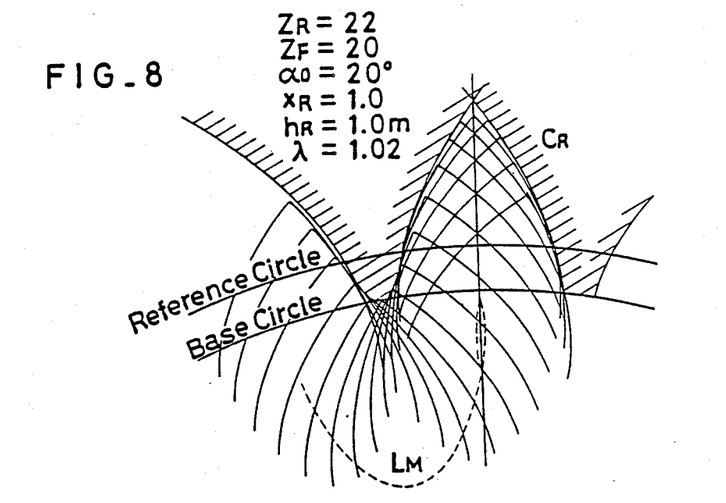
FIG. 8 is an explanatory view showing the motion of a flexible gear engaged with a rigid gear.

The motion of the flexible gear teeth having the profile shown in FIG. 7 with respect to the rigid gear is illustrated in FIG. 8. The dotted line curve $L_M$ is the locus of the origin of the coordinate system fixed on the tooth of the flexible gear. It should be noted that in actual gear fabrication it is necessary to use an appropriate design for assuring that the teeth will not interfere with each other.

IV. Gear generating method for wave gear drive

1. Gear generating method by linear profile cutter using rolling motion

In the foregoing it was explained how the shapes of the imaginary rolling contact plates $P_R$ and $P_F$ are calculated from the motion of the rigid and flexible gears, and how the tooth profiles $C_R$ and $C_F$, which describe the same relative motion as the imaginary rolling contact plates $P_R$ and $P_F$, are calculated.

Figure 9:
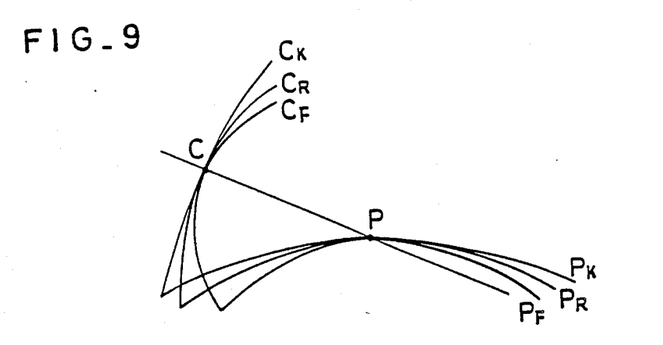
FIG. 9 is an explanatory view showing the relation among the rigid and flexible gears, the tooth profile of a cutter and the imaginary rolling contact plates.

Now with reference to FIG. 9, consideration will be given to a third imaginary rolling contact plate $P_K$ which makes rolling contact with both imaginary rolling contact plates $P_R$ and $P_F$, it being assumed that all three of the imaginary rolling contact plates $P_R$, $P_F$, and $P_K$ make rolling contact at the same point P. In this case the gear face may be either concave or convex. Moreover, defining the tooth profile which makes the same relative motion as the imaginary rolling contact plate $P_K$ as $C_K$ and assuming that all three tooth profiles $C_R$, $C_F$ and $C_K$ make sliding contact at the same point C, the tooth profiles $C_R$, $C_F$ and $C_K$ will mutually mesh.

Now if the tooth profile $C_K$ is defined as the blade of a cutter and the imaginary rolling contact plates $P_R$ and $P_K$ make rolling motion between the cutter and the material being cut, or if the same relative motion is given thereto as that when the imaginary rolling contact plates $P_F$ and $P_K$ make rolling motion, the tooth profile $C_R$ of the rigid gear or the tooth profile $C_F$ of the flexible gear will be generated.

There are an infinite number of possible shapes for the cutter blade. Though it is possible to use a blade shape which is exactly the same as the tooth profile of the gear concerned, there will, by way of example, be described here a gear generating method using a linear tooth profile cutter.

First, the shape of the rolling contact plate of the linear tooth profile cutter will be determined.

Figure 10:
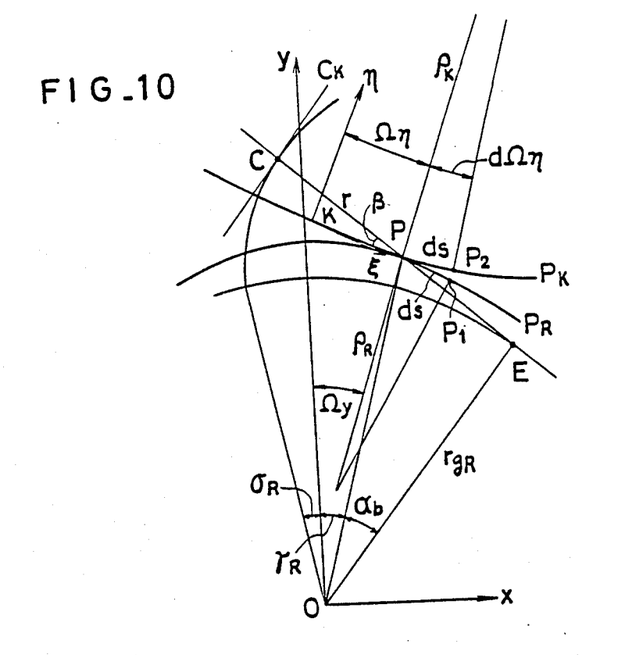
FIG. 10 is an explanatory view showing the positional relation between the rigid gear and the cutter.

Referring to FIG. 10, the relative motion of the rigid gear and the cutter will be considered with reference to a coordinate system (O-x, y) fixed on the rigid gear and a coordinate system (K-$\xi$, $\eta$) fixed on the cutter. The imaginary rolling contact plates $P_R$ and $P_K$ make rolling contact at point P, and the tooth profile $C_R$ and the cutter blade $C_K$ make contact at the point C.

Here, if the wave generator is rotated slightly by an angle $d\phi$ with respect to the rigid gear, the rolling contact point P will become two points that move on the curves of the two imaginary rolling contact plates by a minute displacement dS to the point $P_1$ and the point $P_2$. The shape of the imaginary rolling contact plate of the rigid gear being determined by the angle of rotation $\phi$ of the wave generator relative to the rigid gear as a parameter and being obtained by $$X = X_P(\phi), \quad Y = Y_P(\phi) \tag{23}$$

the relation between the minute displacement dS and the angle $d_{100}$ is $$\frac{dS}{d\phi} = \sqrt{\left(\frac{dx_P}{d\phi}\right)^2 + \left(\frac{dy_P}{d\phi}\right)^2}. \tag{24}$$

Next, defining the angle between common normal of the two imaginary rolling contact plates at the point P and the $\eta$-axis as $\Omega\eta$ and the radius of curvature of the rolling contact plate of the cutter at point P as $\rho_K$, we have $$d\Omega\eta/dS = 1/\rho K \tag{25}.$$

Moreover, since $$d\xi/dS = \cos\Omega\eta, \quad d\eta/dS = \sin\Omega\eta \tag{26},$$

if the coordinates $(\xi, \eta)$ of the point P are made $(\xi_P, \eta_P)$, then $$\xi_P = \int \cos\left(\int \frac{dS}{\rho_K}\right) dS \tag{27}$$

$$\eta_P = \int \sin\left(\int \frac{dS}{\rho_K}\right) dS$$

or $$\xi_P = \int \frac{dS}{d\phi} \cos\left(\int \frac{1}{\rho_K} \frac{dS}{d\phi} d\phi\right) d\phi \tag{27'}$$

$$\eta_P = \int \frac{dS}{d\phi} \sin\left(\int \frac{1}{\rho_K} \frac{dS}{d\phi} d\phi\right) d\phi$$

Thus, once the radius of curvature $\rho_K$ is found, the shape of the cutter rolling contact plate can be found.

Here, if $\rho_R$ is the radius of curvature of the imaginary rolling contact plate of the rigid gear at point P, and $R_R$ and $R_K$ are respectively the radii of the tooth profile $C_R$ and the blade $C_K$ at point C, then in accordance with the Euler-Savary relation, the following will hold $$\frac{1}{\rho_R} - \frac{1}{\rho_K} = -\left(\frac{1}{R_K - r} - \frac{1}{R_R - r}\right) \sin\beta, \tag{28}$$

where r is the length of PC, $\beta$ is the angle between the common tangent of the imaginary rolling contact plates at the point P and PC, and $\rho_R$ is obtained as:

$$\rho_R = \frac{\left\{\left(\frac{dx_P}{d\phi}\right)^2 + \left(\frac{dy_P}{d\phi}\right)^2\right\}^{\frac{3}{2}}}{\left|\frac{d^2 y_P}{d\phi^2} \cdot \frac{dx_P}{d\phi} - \frac{d^2 x_P}{d\phi^2} \cdot \frac{dy_P}{d\phi}\right|}. \tag{29}$$

Since radius $R_K = \infty$ in the case of a linear tooth profile cutter and radius $R_R$, length r and angle $\beta$ are obtained as functions of the angle $\phi$ once the tooth profile of the rigid gear is determined, it turns out that the radius of curvature pk is also a function of the angle $\phi$.

Next, as in the example given in section III above, a calculation will be made for the case where the rigid gear has an involute tooth profile.

Figure 11:
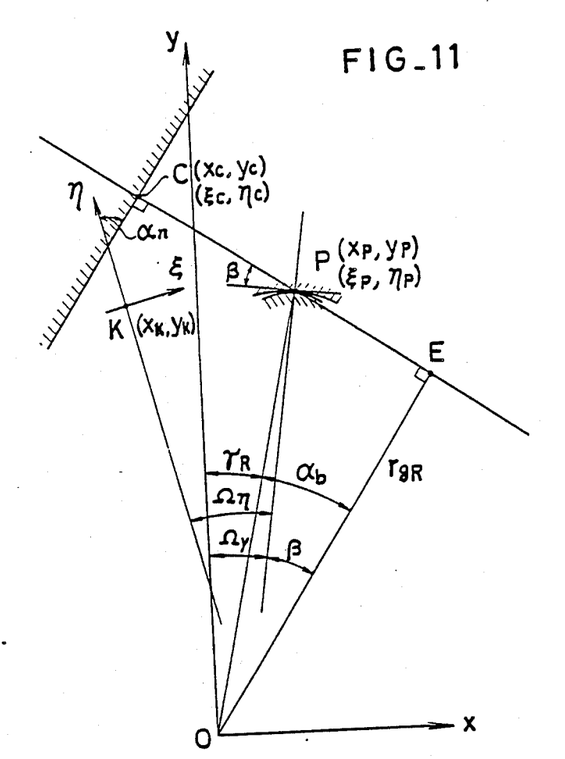
FIG. 11 is an explanatory view showing the engagement between an involute tooth profile rigid gear and a linear rack type cutter.

Referring to FIG. 11, since the coordinates $(x_p, y_p)$ and $(x_c, y_c)$ are known from equations (10) and (22), it follows that $$r = \sqrt{(x_P - x_C)^2 + (y_P - y_C)^2}. \tag{30}$$

$R_R$ is the same as CE in equation (18) so that $$R_R = CE = r_g(\pm\gamma_R + a_b + \sigma_R) \tag{31}$$

and defining the angle between y-axis and the common normal of the two imaginary rolling contact plates at point P as $\Omega_y$, since $$\Omega_y = \frac{\pi}{2} - \tan^{-1}\left(-\frac{dx_P/d\phi}{dy_P/d\phi}\right), \quad (32)$$

it follows that $$\beta = \gamma_R + \alpha_b - \Omega_y, \quad (33)$$

and from equation (28) that $$\frac{1}{\rho_K} = \frac{1}{\rho_R} + \frac{\sin\beta}{R_R - r} \quad (34).$$

Thus the shape of the linear tooth profile cutter rolling contact plate $\rho_K$ can be found by substituting equations (34) and (24) into equation (27').

In the integration according to equation (27') it is sufficient to use the coordinates $(\xi_{PO}, \eta_{PO})$ as the coordinates $(\xi, \eta)$ of the point P when $\phi=0$, and, using $\Omega\eta$, as $\Omega\eta_O$ at that time, to carry out the integration from 0 to $\phi$. By causing the cutter and the gear being cut to describe the same relative motion as that of the rolling contact plate of the so-obtained linear tooth profile cutter and that of the imaginary rolling contact plate of the gear (the rigid gear or the flexible gear), it becomes possible to generate the tooth profile of the rigid gear or the flexible gear, as the case may be. That is to say, for generating the tooth profile using a linear tooth profile cutter, it is sufficient to move the cutter blade in such manner that the surface of the cutter blade lies on the common tangent of the two tooth profiles at the meshing point between the rigid gear and the flexible gear.

2. Gear generating method by linear profile cutter using wave motion

There will now be explained a method for generating a gear with a linear tooth profile cutter employing the wave motion of a wave generator.

For generating the gear profile, it is sufficient to move the cutter blade so that it lies along the common tangent of the two tooth profiles at the meshing point of the rigid gear and the flexible gear.

Figure 12:
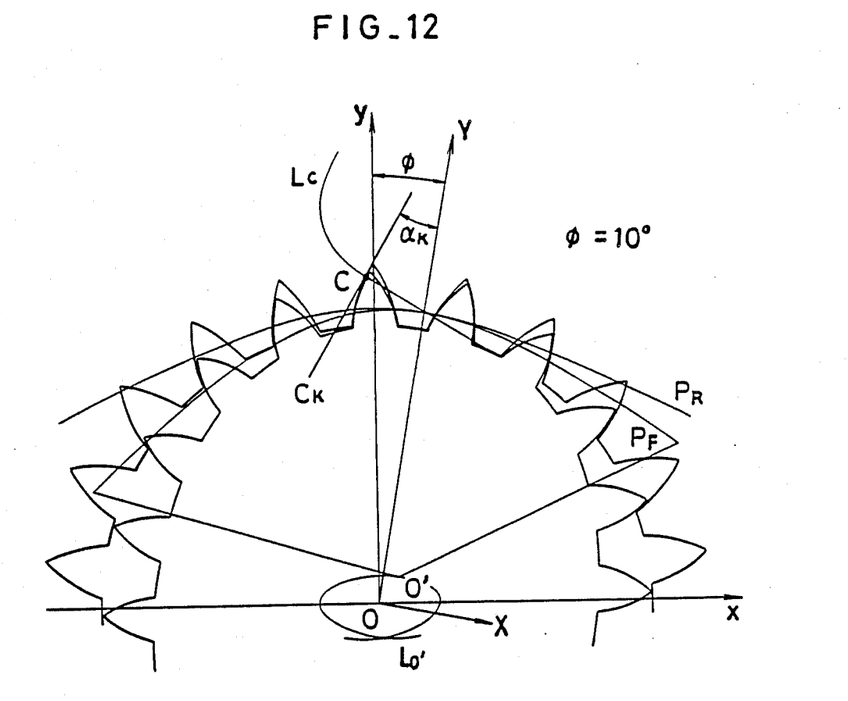
FIG. 12 is an explanatory view relating to a gear generating method using wave motion.

Although the meshing point of the rigid gear and the flexible gear moves along the tooth profiles as seen from the coordinate systems of the respective gears, as seen from the coordinate system fixed on the wave generator it describes a locus as shown in FIG. 12, namely the path of contact L. In FIG. 12, as in the example described in section III above, the rigid gear has an involute tooth profile and is shown at a position rotated by the angle $\phi(=10°)$ with respect to the wave generator with a coordinate system (O-x, y) fixed thereon so that its y-axis passes through the center of the tooth space. Also shown in FIG. 12 are the flexible gear, the cutter blade $C_K$ and the imaginary rolling contact plates $P_R$ and $P_F$. It should be noted that the path of contact shown is that for the left tooth flank.

Defining the coordinates of the point C in the (x, y) system as $(x_C, y_C)$ and those in the (Y, Y) system as $(X_C, Y_C)$, it follows that $$\left.\begin{array}{l} X_C = x_C\cos\phi - y_C\sin\phi \\ Y_C = y_C\cos\phi + x_C\sin\phi \end{array}\right\} \quad (35)$$

where $x_C$ and $y_C$ are obtained from equation (22).

Defining the angle between the common tangent (the blade $C_K$) of the two tooth profiles and the Y-axis as $\alpha_K$, the angle $\alpha_K$ is obtained by the following equation.

$$\alpha_K = \pm(\gamma_R - \phi) + \alpha_b \quad (36),$$

where the angles $\gamma_R$ and $\alpha_b$ are obtained from equations (15) and (16). Where there are alternative signs, the upper one is for the left tooth flank and the lower one for the right tooth flank. The tooth profile will be generated if the cutter blade $C_K$ is held at the position shown in FIG. 12, i.e. at the position relative to the coordinate system fixed on the wave generator indicated by the equations (35) and (36).

In equation (36), if the value of the angle $|\phi|$ is small, the angle $\gamma_R$ will be nearly equal to the angle $\phi$, and the angle $\alpha_K$ will be nearly equal to the angle $\alpha_b$. Moreover, as the angle $\alpha_b$ is substantially constant, it can be concluded that when angle $|\phi|$ is small the angle $\alpha_K$ is substantially constant. In other words, in FIG. 12, the angle $\alpha_K$ can be assumed to be constant over the portion of the path of contact that is substantially linear.

As a result, in the actual generation of the tooth profile of the flexible gear, it is sufficient to cause the material to be cut to be given wave motion by the wave generator while at the same time moving the blade of the cutter in parallel with the coordinate system fixed on the wave generator.

V. Embodiment

A wave gear drive was fabricated in which the number of teeth (ZR) of the rigid gear was 126, the number of teeth (ZF) of the flexible gear was 120 and an elliptical wave generator having two bulged regions was positioned inside the flexible gear.

The rigid gear was of involute type having the following specification:

Module ($m_R$): 0.41500
Tool pressure angle ($\alpha_{OR}$): 34000 deg.
Addendum modification coefficient ($X_R$): 0.0
Tip diameter ($D_{aR}$): 51.60229 mm
Root diameter ($D_{fR}$): 53.03806 mm In determining a practical method for generating a flexible gear having a tooth profile for meshing with the rigid gear of the aforesaid profile, it is advantageous to assume that the theoretically ideal tooth profile for the flexible gear approximates the involute tooth profile. More specifically, it can be presumed that the tooth profile of the flexible gear when it is in the circular state, i.e. when it is not deformed into the elliptical shape, is virtually identical with an involute profile. The method for obtaining this approximate involute gear (hereinafter referred to "flexible involute gear") will now be explained.

Figure 13:
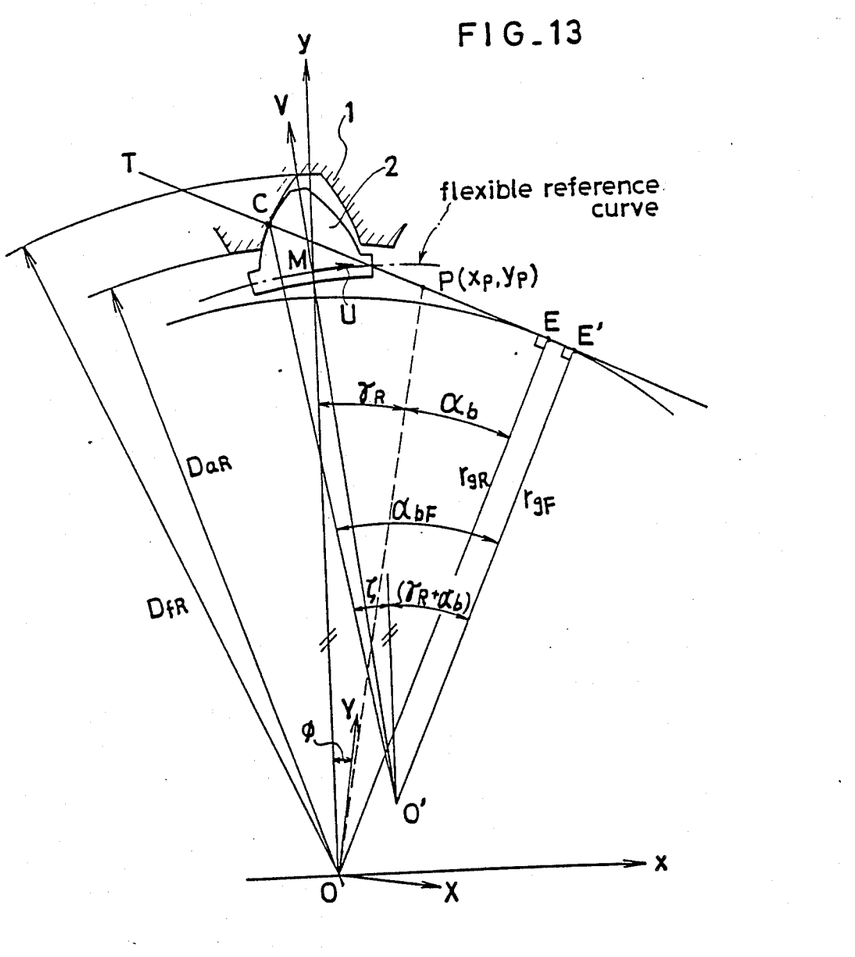
FIG. 13 is an explanatory view showing the engagement of a rigid gear having an involute profile and a flexible involute gear.

Referring to FIG. 13, a coordinate system (O-x, y) is fixed on the rigid gear with its origin at the center of the rigid gear and its y-axis passing through the center of a tooth space thereof. On the other hand, coordinate system (O-X, Y) is fixed on the wave generator with its Y-axis passing through the peak of a bulged region thereof. In FIG. 13, the Y-axis is shown as rotated by an angle $\phi$ with respect to the y-axis, and the tooth of the rigid gear which has the y-axis passing through the center of its tooth space is meshed with a tooth of the flexible gear near the center of the flexible gear tooth flank. The coordinate system (M-u, v) is fixed on this flexible gear tooth with the point M on the flexible reference curve as its origin, the u-axis lying tangent to the flexible reference curve, and the v-axis passing through the center of the flexible gear tooth on which the coordinate system is fixed. Assuming that this flexible gear tooth has the same shape as the tooth of the aforesaid flexible involute gear, the center O' of the flexible involute gear will be on an extension of the v-axis and, if the flexible reference curve is circular, the length of MO' will be equal to the radius $d_{oF}/2$.

It follows, therefore, that the (x, y) coordinates of O' are as shown in equation (37):

$$\left. \begin{array}{l} x_{o'} = x_M + \frac{1}{2}d_{oF}\sin\psi \\ y_{o'} = y_M - \frac{1}{2}d_{oF}\cos\psi \end{array} \right\} \quad (37)$$

where $(x_M, y_M)$ are the (x, y) coordinates of point M as derived from equation (6) and $\psi$ is the angle between the y-axis and the v-axis as derived from equation (7).

The common normal T of the tooth profiles drawn through the meshing point c of the rigid gear and the flexible gear lies tangent to the basic circle of the rigid gear (the point of tangency being designated E), as was explained earlier, while this common normal also lies tangent to the base circle of the flexible involute gear (the point of tangency being designated E'). Thus, the base circle of the flexible involute gear is determined. Defining the base circle radius O'E' as $r_{gF}$, the circle radius is obtained by the following equation.

$$r_{gF} = \overline{O'C} \cos\alpha_{bF} \quad (38)$$

Then defining the tooth thickness half-angle on the base circle of the flexible involute gear as $\sigma_F$, the tooth thickness half-angle is obtained by the following equation.

$$\sigma_F = \tan\alpha_{bF} - (\pm\psi \pm \gamma_R + \alpha_b) \quad (39)$$

where the angle $\psi$ between the y-axis and the v-axis, the angle $\gamma_R$ between OP and the y-axis and the angle $\alpha_b$ made by OP and OE are as derived from equations (7), (15) and (16), respectively. P is the point of contact between the imaginary rolling contact plates of the rigid and flexible gears. Moreover, $\alpha_{bF}$ is the angle between O'C and O'E', and is obtained from equation (40).

$$\alpha_{bF} = \pm\zeta \pm \gamma_R + \alpha_b \quad (40)$$

here $\zeta$ is the angle between O'C and the y-axis and is derived from $$\zeta = \sin^{-1}\left(\frac{x_{o'} - x_c}{\overline{O'C}}\right) \quad (41)$$

and $$\overline{O'C} = \sqrt{(x_{o'} - x_c)^2 + (y_{o'} - y_c)^2} \quad (42)$$

where the coordinates $(x_c, y_c)$ of point C are derived from equation (22)

As the base circle radius $r_{gF}$ of the flexible involute gear and the tooth thickness half-angle $\sigma_F$ on the base circle can be obtained as set out above, when one of the module $m_F$, the tool pressure angle $\alpha_{oF}$ and the addendum modification coefficient $x_F$ is given, the remaining two, can be obtained from $$r_{gF} = \frac{1}{2}Z_F m_F \cos\alpha_{oF} \quad (43)$$

$$\sigma_F = \frac{\pi}{2Z_F} + \text{inv}\,\alpha_{oF} + \frac{2\tan\alpha_{oF}}{Z_F} \cdot x_F \quad (44)$$

Figure 14:
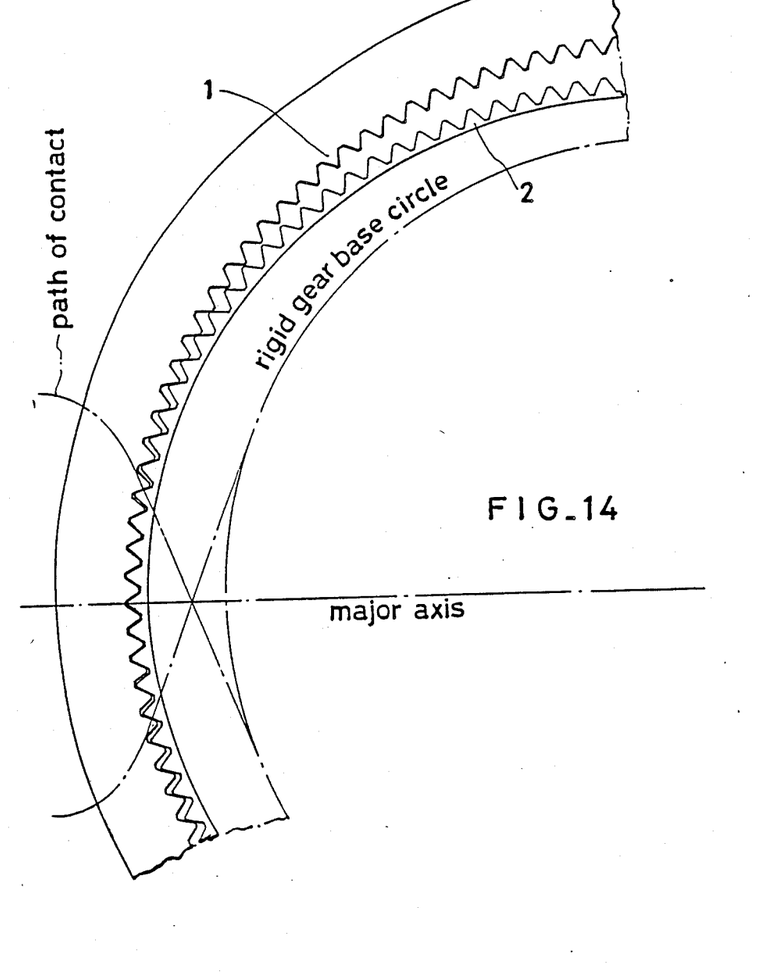
FIG. 14 is a schematic explanatory view showing the engagement of a rigid gear and a flexible gear of the wave gear drive according to the present invention.

Assuming that the flexible involute gear is a standard gear having $X_F = 0$, remaining specifications are as follows:

Module $(m_F)$: 0.42014
Tool pressure angle $(\alpha_{oF})$: 35.110 deg.
Addendum modification coefficient $(x_F)$: 0.0
Tip diameter $(D_{aF})$: 51.13559 mm
Root diameter $(D_{fF})$: 49.65997 mm FIG. 14 illustrates the state of engagement between the rigid gear and the flexible gear which were manufactured by way of experiment in accordance with the aforementioned embodiment, provided that the coefficient of deviation was 0.986 and $d_{oF} = 49.360$.

In the case of a wave gear drive having a rigid gear fixed to a housing, a wave generator coupled to an input shaft and a flexible gear coupled to an output shaft, the reduction ratio of the wave gear drive is obtained by $(Z_R - Z_F)/Z_F$. The reduction ratio of the existing ordinary wave gear drives falls in the range of from 1/80 to 1/300 and that of the existing special wave gear drives is 1/50 at most. According to the present invention, however, there can be provided a wave gear drive having a reduction ratio of 1/20 which is a considerably low value.

What is claimed is:

1. In a wave gear drive comprising a rigid gear, a flexible gear for performing wave motion and a wave generator for causing the flexible gear to perform wave motion, the flexible gear engaging with the rigid gear at a plurality of bulged regions of the flexible gear such that the number of gear teeth between adjacent bulged regions differs between the rigid gear and the flexible gear and relative motion being caused between the rigid gear and the flexible gear by shifting of the engagement regions, a rigid gear and a flexible gear formed such that the tooth profile thereof is formed to satisfy the conditions that the shapes of imaginary rolling contact plates which perform the same motion as the respective engaged tooth pairs of the rigid gear and the flexible gear are determined to have the same shape as the loci described on planes fixed on the respective teeth by the respective momentary centers of relative tooth motion and that the common normal of the respective tooth pairs at the meshing point passes through the momentary contact point of the rolling contact plates.

2. In a gear generating method for generating the flexible gear of a wave gear drive comprising a rigid gear, a flexible gear, and a wave generator for causing the flexible gear to perform wave motion, the improved gear generating method comprising the steps of establishing the conditions that the shapes of imaginary rolling contact plates which performs the same motion as the respective engaged tooth pairs of the rigid gear and the flexible gear are determined to correspond to the loci described on planes fixed on the respective teeth by the respective momentary centers of relative tooth motion and that the common normal of the respective tooth pairs at the meshing point passes through the momentary contact point of the first and second rolling contact plates, and, under the condition that a cutter blade making common contact with the two gears at the meshing point thereof and a third imaginary rolling contact plate in contact with the two rolling contact plates at the same contact point describe the same relative motion, imparting to said blade the relative motion when these make rolling contact.

3. In a gear generating method for generating the flexible gear of a wave gear drive comprising a rigid gear, a flexible gear, and a wave generator for causing the flexible gear to perform wave motion, the improved gear generating method comprising the steps of establishing the conditions that the shapes of imaginary rolling contact plates which perform the same motion as the respective engaged tooth pairs of the rigid gear and the flexible gear are determined to correspond to the loci described on planes fixed on the respective teeth by the respective momentary centers of relative tooth motion and that the common normal of the respective tooth pairs at the meshing point passes through the momentary contact point of the first and second rolling contact plates, and, under the condition that a cutter blade making common contact with the two gears at the meshing point thereof and a third imaginary rolling contact plate in contact with the two rolling contact plates at the same contact point describe the same relative motion, causing the wave generator to impart wave motion to the material being cut and at the same time causing the blade of a cutter to move parallel to a coordinate system fixed on the wave generator.

* * * * *